April 3, 1962   H. S. CAMPBELL   3,028,188
LIMIT STOP FOR CARGO RELEASE MECHANISM
Filed May 22, 1959
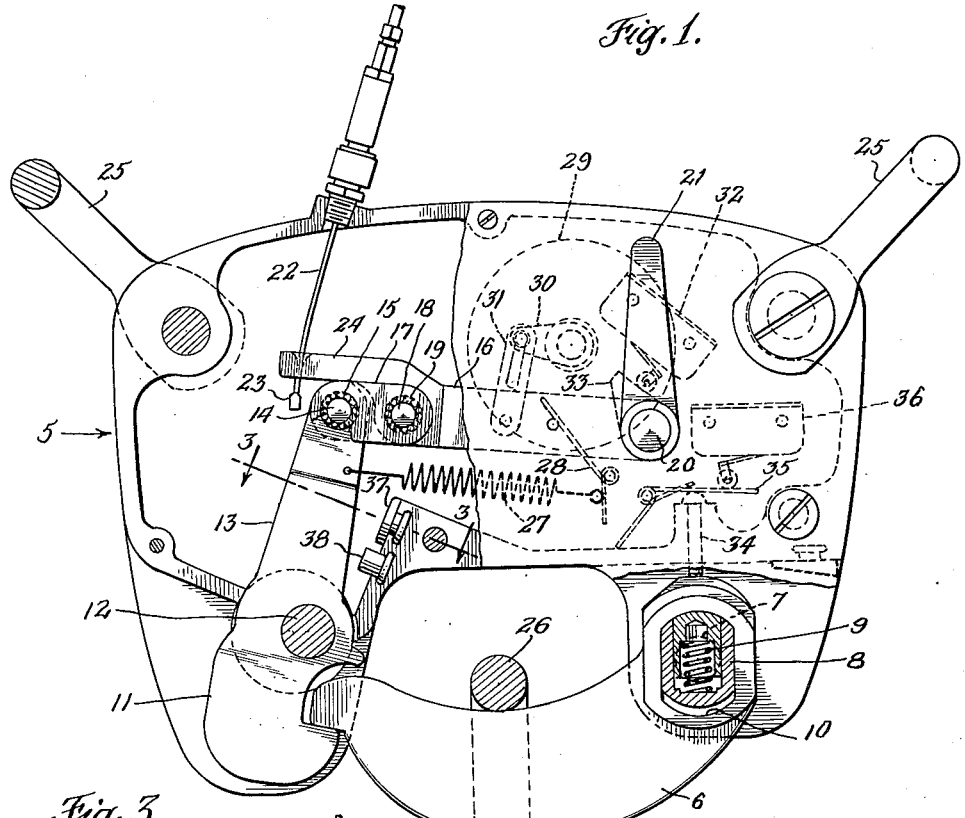
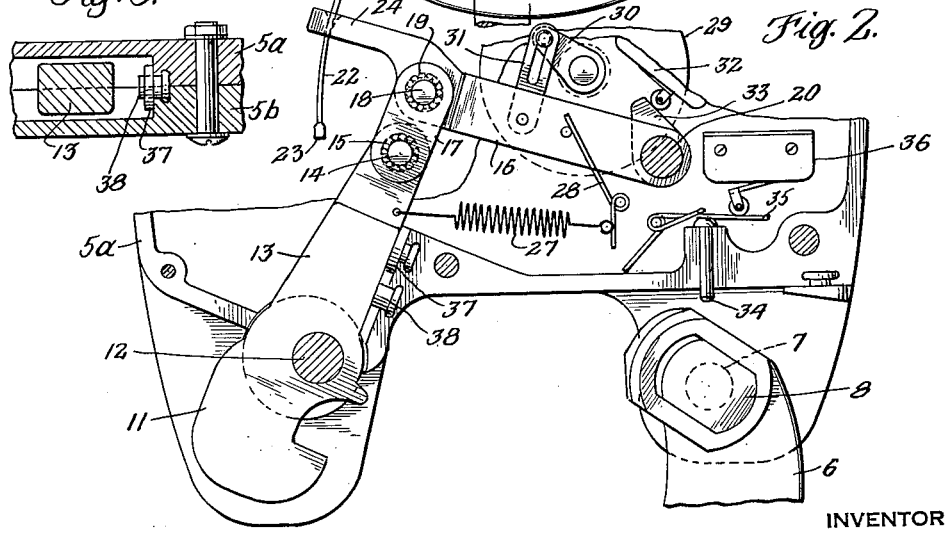
INVENTOR
HARRIS S. CAMPBELL
BY
Raymond W. Cotten
ATTORNEY

United States Patent Office 3,028,188
Patented Apr. 3, 1962

3,028,188
LIMIT STOP FOR CARGO RELEASE MECHANISM
Harris S. Campbell, Bryn Athyn, Pa., assignor to Eastern Rotorcraft Corporation, Doylestown, Pa., a corporation of Pennsylvania
Filed May 22, 1959, Ser. No. 815,018
4 Claims. (Cl. 294—83)

This invention relates to cargo handling release hooks and is more particularly concerned with improved limit stop construction for controlling operating mechanism in such release hooks.

In cargo release hooks of the type to which the present invention is applicable heavy loads, often weighing many tons, are handled and it may be necessary to operate the releasing mechanism while this load is being supported in the release hook. Upon release the heavy loads being applied to the latching mechanism cause extremely high speeds in the opening direction. At the fully opened position this latch mechanism must be brought to a stop quickly. Also in mechanism for carrying extremely high hook loads it is desirable to use anti-friction bearings in some of the pivot connections in order to reduce the applied releasing loads. The sudden stopping of mechanism containing anti-friction bearings against a positive stop can cause tremendous impact loads which will damage the anti-friction bearing and cause brinelling and distortion of the races and rolling elements. It is a primary object of the invention to provide improved stop construction to reduce the impact forces against the stop and thus reduce damage to delicate parts of the mechanism such as anti-friction pivot bearings.

A further object of the invention is to provide a stop construction which will absorb a large amount of energy in a small distance without introducing high rebound forces in the mechanism. This object includes the provision of an auxiliary stop device which is contacted slightly before the final stop, said auxiliary stop being composed of material having suitable viscosity or hysteresis characteristics to absorb the impact energy and release it at a relatively low speed.

How these and other objects and advantages of the invention are accomplished will be evident from the following description of the drawings in which—

FIGURE 1 is a view of a cargo release hook incorporating the present invention showing the parts in load holding position.

FIGURE 2 is a view generally similar to FIGURE 1 but with the front part of the housing removed and showing the operating mechanism and load carrying parts in load released position.

FIGURE 3 is a sectional view taken in the direction of arrows 3—3 FIGURE 1.

As illustrated in the figures the cargo release equipment with which the present invention is used preferably includes a frame or housing 5. This may consist of a rear portion 5a and a front part 5b, see FIGURE 3. At the lower side of the frame a load beam 6 is supported at one end by means of a pivot member 7. The pivot member 7 forms part of a trunnion 8 in which is mounted a spring 9. The load beam 6 is formed with a specially shaped aperture 10 adapted to accommodate the trunnion 8 with additional space to permit a slight motion for a load releasing condition which will be described later. The other end of the load beam 6 is shaped to engage a latch member 11 which in turn is supported by the frame 5 by means of pivot 12. The upper portion of the latch member 11 extends into the housing 5 in the form of an arm 13. At the top end of arm 13 a pivot 14 incorporating a needle or roller type bearing 15 connects the arm 13 to an internal lever 16 by means of a pair of side links 17, the opposite end of the side links 17 being connected to the lever 16 by means of a pivot 18 incorporating a needle bearing 19 similar to bearing 15.

One end of the internal lever 16 is pivotally mounted in the housing 5 by means of trunnion elements 20 which permit the lever 16 to be mounted so that it can be swung from closed position of the latch 11 as illustrated in FIGURE 1 to open position of the latch 11 as illustrated in FIGURE 2.

Trunnion 20 extends through the front portion of the housing 5b and has attached to it a handle 21 which permits manual operation of the mechanism from closed to open position. Likewise a cable 22 which is provided with a terminal member 23 can engage the end 24 of the internal lever 16 to cause the latch 11 to be moved to open position. This cable extends to an operator to allow manual release of the mechanism when so desired.

Shackles 25 may be provided to support the release unit under a helicopter or in any other position where it is to be used for supporting a load. Ring 26 in FIGURE 1 is shown in position to connect a load of cargo to the load beam 6. An opening spring 27 and a closing spring 28 provide for holding the latch and lever assembly in either the closed position as shown in FIGURE 1 or the open position as shown in FIGURE 2. It will be noted that in both closed and open positions the links 17 form a dead center relationship with the lever 16 and latch arm 13 respectively. Thus the lever 16 must be moved to open the latch 11 and the latch 11 must be moved to close the mechanism.

In addition to the manual releasing mechanism mentioned previously a solenoid 29 which is mounted on the rear housing 5a is provided for moving the mechanism from closed to open position electrically. The solenoid illustrated is of the rotary type and is equipped with an arm 30 which in turn is connected by a slotted link 31 to the internal lever 16. Energization of the solenoid circuit as by pressing a button at the operator's position causes the arm 30 to move to the position shown in FIGURE 2 thus causing opening of the cargo release device. A normally closed switch 32 is moved by virtue of the arm 33 attached to the lever 16. When the lever 16 is moved to open position switch 32 disconnects the solenoid circuit to prevent the possibility of damage thereto by continued application of electrical current after actuation.

If desired the operator may further operate the cargo release in a fashion to provide for automatic touchdown release of the load. With the load in position as shown in FIGURE 1 the spring 9 is compressed and the end of the beam is supported against the top of the trunnion 8. When the load contacts the ground the weight is removed from the beam 6 with the result that spring 9 pushes the end of the beam upwardly a small amount and this motion is transmitted by the pin 34 to move small actuator beam 35 and close normally open switch 36. Providing the operator has previously closed the arming circuit for energizing switch 36 the setting down of the load in this fashion completes the circuit to the solenoid and it is energized to cause opening of the latch mechanism. As the beam 6 opens to the position in FIGURE 2 it swings away from the pin 34 and thus reopens the switch 36 to break the circuit.

When a load is released from the beam 6 before the load reaches the ground the loads transmitted to the latch mechanism cause extremely high opening velocities. A stop 37 which is preferably a replaceable metallic stop is provided. This may be held in the parts of housing 5 by means of a suitably shaped cavity into which the stop 37 may be inserted when the separable parts of the housing are disassembled. The needle bearings 15 and 19 are used to reduce the loads in the operating mechanism and are particularly useful in high capacity load release devices where cargos of several tons are being lifted. Under these conditions full load releases cause unusually severe impact loads when the latch mechanism engages the stop 37. As a result brinell damage or pounding of the races may occur in the needle bearings causing extremely short operating life. To overcome this problem an additional stop 38 has been provided. It will be noted in FIGURES 1 and 3 that stop 38 extends slightly further from the housing 5 than the stop 37. Stop 38 is preferably made of material having a high hysteresis so that while it compresses and absorbs the impact energy it is relatively slow to resume its initial state. A suitable material for the secondary stop 38 is nylon.

FIGURE 2 shows the latch 11 at the moment when the arm portion 13 has bottomed against both stops 37 and 38. Since the arm 13 contacts stop 38 slightly before stop 37 decelerating action due to the resilience in stop 38 over a short distance is accomplished. This decelerating or cushioning action is sufficient to protect the anti-friction roller bearings from brinelling or other damage due to the impact of engaging the limit stop.

From the foregoing it will be evident that the stop structure which includes this secondary stop of nylon or other material having suitable resilient energy absorbing characteristics permits the satisfactory use of anti-friction bearings in mechanism of this nature. Thus the release hook mechanism may be refined to provide reduced mechanical operating forces even though high loads are carried in the mechanism. This is of advantage in permitting the use of lower powered electrical devices for releasing the mechanism and also provides for reduced manual forces when manual release is to be accomplished. The arrangement of stops allows ready replacement when continued use causes wear or damage to the resilient or fixed stops.

I claim:
1. A cargo release device having a frame, a latch part pivotally mounted in said frame for limited angular movement between load carrying and release positions, a control link pivotally connected to said latch part by means of an anti-friction type bearing, an extreme position stop positioned to engage said latch part and a resilient low speed releasing energy absorbing secondary stop element positioned to engage said latch part slightly before it reaches the extreme position stop.

2. A cargo release device having a frame, a latch part pivotally supported on said frame for limited angular travel between load carrying and release positions, said frame having a peripheral wall, a load carrying portion of said latch part extending outside said peripheral wall, an arm portion of said latch extending inside said peripheral wall and swingable with respect to the pivotal support, a latch operating link connected to said arm portion, the connection between said link and said arm portion including an anti-friction bearing pivot, a limit stop engaging said arm portion in release position and a low speed releasing energy absorbing stop member positioned to engage said arm portion slightly before it engages said limit stop.

3. A cargo release device including a frame, a latch part pivotally supported on said frame at its mid-region, a latch operating link located at the moving end of said part, a connection between said latch part and said link including an anti-friction bearing, a metallic stop located on said frame in position to engage said latch part in extreme release position, a secondary replaceable, non-metallic low speed releasing energy absorbing stop positioned to engage said latch part slightly before reaching the extreme release position.

4. A cargo release device having a frame, a latch part having a pivot supporting it at its mid-region on said frame, a latch operating link located adjacent the upper end of said latch part, a connection between said latch part and said link including an anti-friction bearing, a replaceable metallic stop mounted on said frame between said pivot and the upper end of said latch part, a replaceable non-metallic stop of low speed releasing energy absorbing synthetic material located adjacent said metallic stop but projecting slightly farther into the path of said latch part than said metallic stop to engage said latch part before its engagement with said metallic stop.

References Cited in the file of this patent
UNITED STATES PATENTS

| | | |
|---|---|---|
| 2,202,053 | Helmond | May 28, 1940 |
| 2,228,060 | Lescher et al. | Jan. 7, 1941 |
| 2,491,400 | Thumim | Dec. 13, 1949 |
| 2,538,913 | Roethel | Jan. 23, 1951 |
| 2,620,219 | Novotney | Dec. 2, 1952 |
| 2,868,580 | Stevens et al. | Jan. 13, 1959 |
| 2,868,581 | Minty et al. | Jan. 13, 1959 |
| 2,869,523 | Murphy | Jan. 20, 1959 |

OTHER REFERENCES

Plastics Bulletin, vol. 12, No. 47, 1950, published by Du Pont, Wilmington, Delaware. (Copy on file in Polyamid Digest, Div. 15, U.S. Patent Office.)